United States Patent
Chen

(10) Patent No.: US 9,258,674 B2
(45) Date of Patent: Feb. 9, 2016

(54) TRACKING DEVICE AND TRACKING DEVICE CONTROL METHOD

(71) Applicant: AthenTek Inc., Taipei (TW)

(72) Inventor: Chun-Nan Chen, Taipei (TW)

(73) Assignee: AthenTek Inc., Taipei (TW)

( * ) Notice: Subject to any disclaimer, the term of this patent is extended or adjusted under 35 U.S.C. 154(b) by 0 days.

(21) Appl. No.: 14/328,641

(22) Filed: Jul. 10, 2014

(65) Prior Publication Data

US 2015/0296333 A1  Oct. 15, 2015

Related U.S. Application Data

(60) Provisional application No. 61/979,472, filed on Apr. 14, 2014.

(51) Int. Cl.
*H04W 24/00* (2009.01)
*H04W 4/02* (2009.01)
*H04W 64/00* (2009.01)

(52) U.S. Cl.
CPC ............... *H04W 4/02* (2013.01); *H04W 64/00* (2013.01); *H04W 64/003* (2013.01); *H04W 64/006* (2013.01)

(58) Field of Classification Search
CPC ....... H04W 4/02; H04W 4/021; H04W 4/022; H04W 4/023; H04W 4/025; H04W 4/04; H04W 40/00; H04W 40/24; H04W 64/00; H04W 64/003; H04W 64/006
USPC .......... 455/404.1, 404.2, 456.1, 456.3, 456.4, 455/456.5, 456.6
See application file for complete search history.

(56) References Cited

U.S. PATENT DOCUMENTS

| | | | |
|---|---|---|---|
| 6,405,132 B1 * | 6/2002 | Breed et al. | 701/301 |
| 2007/0018811 A1 * | 1/2007 | Gollu | 340/539.13 |
| 2010/0255794 A1 * | 10/2010 | Agnew | 455/77 |
| 2013/0288703 A1 * | 10/2013 | Yang et al. | 455/456.1 |
| 2014/0085084 A1 * | 3/2014 | Ghazarian | 340/539.13 |
| 2014/0274225 A1 * | 9/2014 | Lacatus et al. | 455/574 |

* cited by examiner

*Primary Examiner* — Jean Gelin

(57) ABSTRACT

A tracking device and a tracking device control method with intelligent safe-zone demarcation are provided. The tracking device includes a positioning module, a long-range transceiver and a microcontroller. The microcontroller is configured to operate the long-range transceiver to regularly transmit position information of the tracking device to a server during a data-collection period for behavior analysis of a tracked object equipped with the tracking device and for safe-zone demarcation of the tracking device. The safe-zone demarcation is adaptive to habitual behaviors of the tracked object, and the habitual behaviors are obtained from the behavior analysis.

18 Claims, 8 Drawing Sheets

400

| Time \ Day | 1 | 2 | 3 | 4 | 5 | 6 | 7 | 8 | 9 | 10 | 11 | 12 | 13 |
|---|---|---|---|---|---|---|---|---|---|---|---|---|---|
| | | | Weekdays | | | | | | | Weekdays | | | |
| 00:00~01:00 | A | A | A | A | A | A | A | A | A | A | A | A | A |
| ≀ | A | A | A | A | A | A | A | A | A | A | A | A | A |
| 06:00~07:00 | A | A | A | A | A | A | A | A | A | A | A | A | A |
| 07:00~08:00 | R1 | R1 | R1' | R1" | R1 | A | R6 | R1 | R1 | R1' | R1' | R1" | A |
| 08:00~09:00 | B | B | B | B | B | A | O2 | B | B | B | B | B | A |
| ≀ | B | B | B | B | B | A | O2 | B | B | B | B | B | A |
| 11:00~12:00 | B | B | B | B | B | A | O2 | B | B | B | B | B | A |
| 12:00~13:00 | R2 | R2 | R2 | R2 | R2 | R4 | O2 | R2 | R2 | R2 | R2 | R2 | R4 |
| 13:00~14:00 | C | C | C | C | C | O1 | O2 | C | C | C | C | C | O1 |
| ≀ | C | C | C | C | C | O1 | O2 | C | C | C | C | C | O1 |
| 16:00~17:00 | C | C | C | C | C | O1 | O2 | C | C | C | C | C | O1 |
| 17:00~18:00 | R3 | R3 | R3 | R3 | R3 | R5 | R7 | R3 | R3 | R3 | R3 | R3 | R5 |
| 18:00~19:00 | A | A | A | A | A | A | A | A | A | A | A | A | A |
| ≀ | A | A | A | A | A | A | A | A | A | A | A | A | A |
| 23:00~00:00 | A | A | A | A | A | A | A | A | A | A | A | A | A |

| FIG. 4A | FIG. 4B |

FIG. 4A

| | Weekdays | | | | | | | Weekdays | | | | | | Weekdays | |
|---|---|---|---|---|---|---|---|---|---|---|---|---|---|---|---|
| 14 | 15 | 16 | 17 | 18 | 19 | 20 | 21 | 22 | 23 | 24 | 25 | 26 | 27 | 28 | 29 | 30 |
| A | A | A | A | A | A | A | A | A | A | A | A | A | A | A | A |
| A | A | A | A | A | A | A | A | A | A | A | A | A | A | A | A |
| A | A | A | A | A | A | A | A | A | A | A | A | A | A | A | A |
| R6 | R1 | R1' | R1' | R1 | R1" | A | R6 | R1 | R1' | R1 | R1" | R1 | A | R6 | R1' | R1 |
| O2 | B | B | B | B | B | A | O2 | B | B | B | B | B | A | O2 | B | B |
| O2 | B | B | B | B | B | A | O2 | B | B | B | B | B | A | O2 | B | B |
| O2 | B | B | B | B | B | A | O2 | B | B | B | B | B | A | O2 | B | B |
| O2 | R2 | RA | R2 | R2 | R2 | R4 | O2 | R2 | R2 | R2 | R2 | R2 | R4 | O2 | R2 | R2 |
| O2 | C | C | C | C | C | O1 | O2 | C | C | C | C | C | O1 | O2 | C | C |
| O2 | C | C | C | C | C | O1 | O2 | C | C | C | C | C | O1 | O2 | C | C |
| O2 | C | C | C | C | C | O1 | O2 | C | C | C | C | C | O1 | O2 | C | C |
| R7 | R3 | R3 | R3 | R3 | R3 | R5 | R7 | R3 | R3 | R3 | R3 | R3 | R5 | R7 | R3 | R3 |
| A | A | A | A | A | A | A | A | A | A | A | A | A | A | A | A |
| A | A | A | A | A | A | A | A | A | A | A | A | A | A | A | A |
| A | A | A | A | A | A | A | A | A | A | A | A | A | A | A | A |

FIG. 4B

TRACKING DEVICE AND TRACKING DEVICE CONTROL METHOD

CROSS REFERENCE TO RELATED APPLICATIONS

This application claims the benefit of U.S. Provisional Application No. 61/979,472, filed on Apr. 14, 2014, the entirety of which is incorporated by reference herein.

BACKGROUND OF THE INVENTION

1. Field of the Invention

The present invention relates to a tracking device of a tracking system and it particularly relates to a tracking-device control method.

2. Description of the Related Art

A tracking system is used for observing persons or objects on the move and supplying a timely ordered sequence of respective location data to a model. A tracking system may employ a tracking device that is applied to the object being tracked and that transmits an alarm and message including the object's location when they leave a safe zone as defined by geo-fencing or a specially designed wireless beacon.

A geo-fence is a virtual perimeter around a predefined location or a predefined set of boundaries. Only stationary safe zones are built by geo-fencing. As for a safe zone defined by a specially designed wireless beacon, a burn-in process is required to register the specially designed wireless beacons to a memory (e.g. a ROM) of the tracking device.

BRIEF SUMMARY OF THE INVENTION

A tracking device and a tracking device control method with intelligent safe zones are disclosed.

A tracking device in accordance with an exemplary embodiment of the disclosure includes a positioning module for satellite navigation, a long-range transceiver for digital cellular communication, and a microcontroller controlling the positioning module and the long-range transceiver. The microcontroller is further configured to operate the long-range transceiver to regularly transmit position information of the tracking device to a server during a data-collection period for behavior analysis of a tracked object (a person or a pet or anything) equipped with the tracking device and for a safe-zone demarcation of the tracking device. The safe zones are adaptive to habitual behaviors of the tracked object. The habitual behaviors are obtained from the behavior analysis.

In another exemplary embodiment, a tracking-device control method is disclosed, including the following steps: providing a server for a tracking device comprising a positioning module for satellite navigation, wherein the tracking device further comprises a long-range transceiver for digital cellular communication; and operating the long-range transceiver to regularly transmit position information of the tracking device to the server during a data-collection period for behavior analysis of a tracked object equipped with the tracking device and for a safe-zone demarcation of the tracking device. The safe zones are adaptive to habitual behaviors of the tracked object. The habitual behaviors are obtained from the behavior analysis.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIGS. 4A and 4B shows a position information collection table 400 of the tracked object of FIG. 3, which is organized from the position information uploaded during a data-collection period, wherein the data-collection period lasts N days and N is 30;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
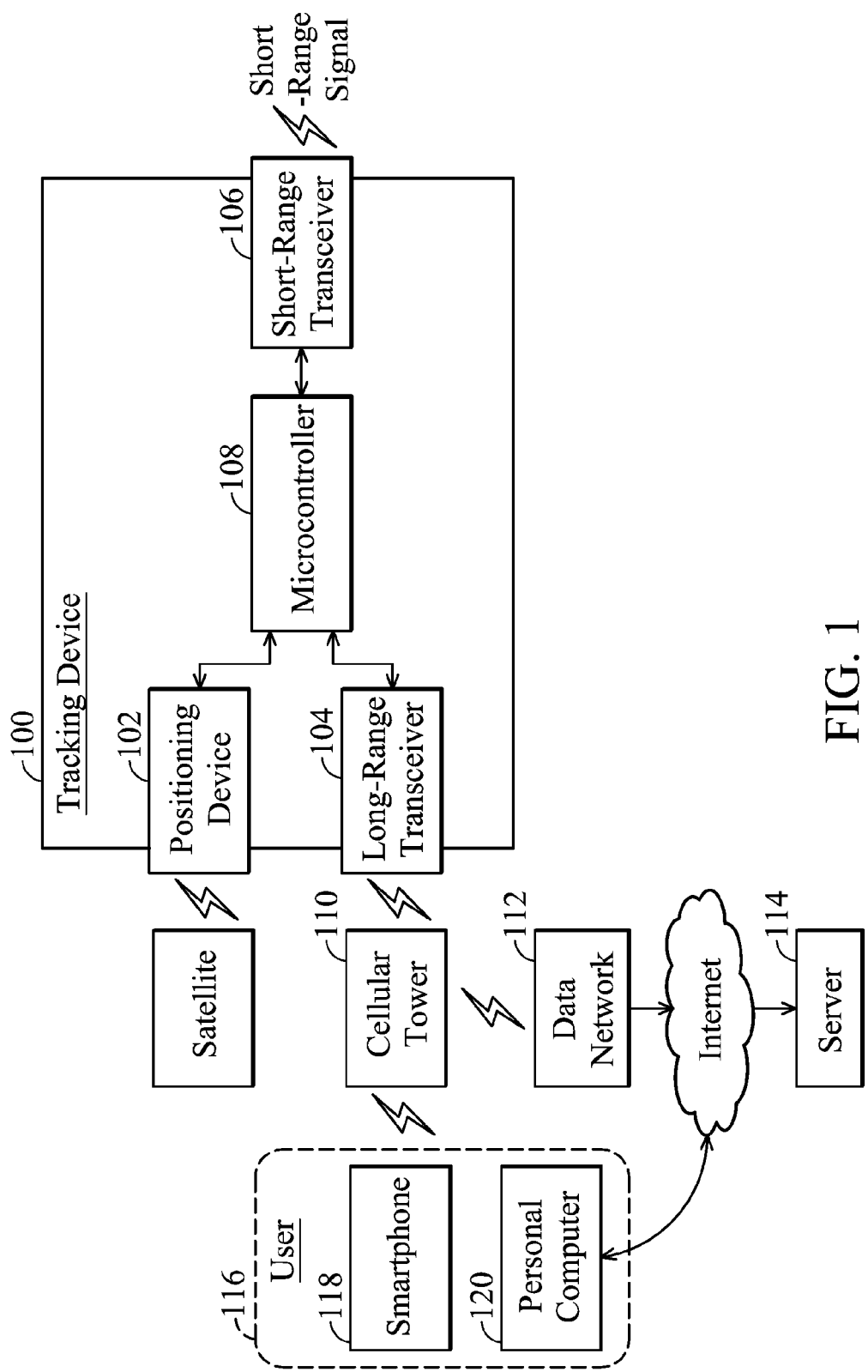
FIG. 1 is a block diagram depicting a tracking device 100 in accordance with an exemplary embodiment of the disclosure.

FIG. 1 is a block diagram depicting a tracking device 100 in accordance with an exemplary embodiment of the disclosure. The tracking device 100 includes a positioning module 102, a long-range transceiver 104, a short-range transceiver 106, and a microcontroller 108. The positioning module 102, e.g. a GPS module, a GNSS (Global Navigation Satellite System) module and so on, is provided for satellite navigation. The long-range transceiver 104, e.g., a GSM transceiver, a 3G transceiver or any telecommunication transceiver, is provided for digital cellular communication. The short-range transceiver, e.g., Wi-Fi transceiver, BT transceiver, NFC transceiver, RFID transceiver and so on, is provided for radio-signal communication within a shorter range in comparison with the digital cellular communication. The positioning module 102, the long-range transceiver 104 and the short-range transceiver 106 are controlled by the microcontroller 108.

Position information of the tracking device 100 may be detected by the positioning module 102 or the short-range transceiver 106. The position information may indicate the appearance position (e.g., at which the tracking device appears) of the tracking device 100, e.g., at an exact latitude and longitude location (detected by the positioning module 102) or around a wireless beacon (detected by the short-range transceiver 106). The position information may further show the route taken by the tracked object, e.g., a series of exact latitude and longitude locations (detected by the positioning module 102) or continuously around a mobile wireless beacon (detected by the short-range transceiver 106).

During a data-collection period, the microcontroller 108 is configured to operate the long-range transceiver 104 to regularly transmit the position information of the tracking device 100 to be received by a cellular tower 110 and then conveyed to a data network 112 and uploaded from the data networks 112 to a server 114 through the internet. Based on the position information collected during the data-collection period, the server 114 performs behavior analysis of a tracked object equipped with the tracking device 100. Based on the behavior analysis, habitual behaviors of the tracked object are obtained. The server 114 performs a safe-zone demarcation for the tracking device 100 based on the habitual behaviors obtained from the behavior analysis. In comparison with a conventional safe-zone demarcation (in a virtual perimeter around a predefined location or within a predefined set of boundaries or around a predefined wireless beacon), intelligent safe zones adaptive to the habitual behaviors of the tracked object equipped with the tracking device 100 are provided in this disclosure.

The user 116 of the tracking device 100 may operate a personal computing device (a smartphone 118, a personal computer 120 and so on) to monitor the tracking device 100. When the tracked object equipped with the tracking device 100 is not within the intelligent safe zones defined according to the habitual behaviors of the tracked object, the server 114 may notify the user 116 through digital cellular communication to transmit a message to the smartphone 118 of the user 116, or, the server 114 may transmit a message to the personal computer 120 of the user 116 through the internet.

Figure 2:
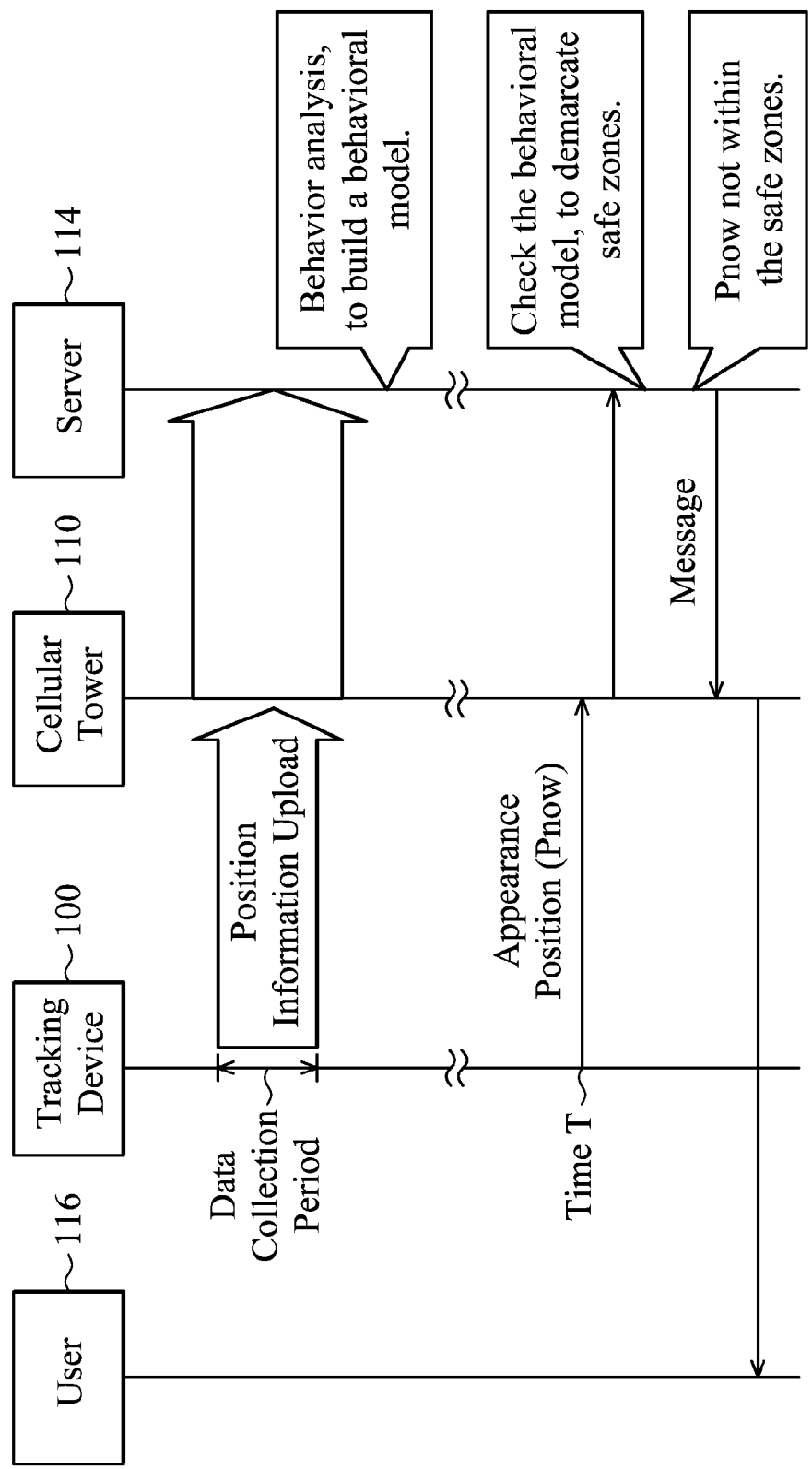
FIG. 2 is a call-flow diagram for controlling the tracking device 100, showing how a behavioral model of a tracked object equipped with the tracking device 100 is built and how the behavioral model is applied to demarcate intelligent safe zones.

FIG. 2 is a call-flow diagram for controlling the tracking device 100, showing how a behavioral model of a tracked object equipped with the tracking device 100 is built and how the behavioral model is applied to demarcate intelligent safe zones. As shown, during a data-collection period, the tracking device 100 uploads position information to the server 114 through the cellular tower 110. The position information may indicate the appearance positions of the tracking device 100 during the data-collection period or show the routes taken by the tracked object. The server 114 performs behavior analysis based on the position information collected during the data-collection period, to build a behavioral model of the tracked object. The safe zones for the tracking device 100 are demarcated by the server 114 based on the behavioral model of the tracked object. For example, at time T after the data-collection period, the tracking device 100 transmits appearance position Pnow to the server 114 through the cellular tower 110. The server 114 checks the behavioral model with respect to the time T and thereby demarcates safe zones for the tracking device 100 based on the habitual behaviors (obtained from the behavioral model built from the behavior analysis) of the tracked object. In some exemplary embodiments, the behavioral model further shows preferred routes of the tracked object. The server 114 may further check the behavioral model for the preferred routes with respect to an expected travel of the tracked object and thereby demarcate safe zones for the tracking device 100. When the appearance position Pnow is not within the demarcated safe zones, the server 114 transmits a message through the cellular tower 110 to the user 116. The user 116 is notified of the status of the tracked object.

In another exemplary embodiment, the data collection for behavior analysis is always on. The behavioral model is updated in real time. In such cases the data collection period is extended with the running of the tracking device 100.

In the following paragraphs, an example is described to show how a behavioral model of a tracked object equipped with the tracking device 100 is established and how the behavioral model is applied to demarcate intelligent safe zones.

Figure 3:
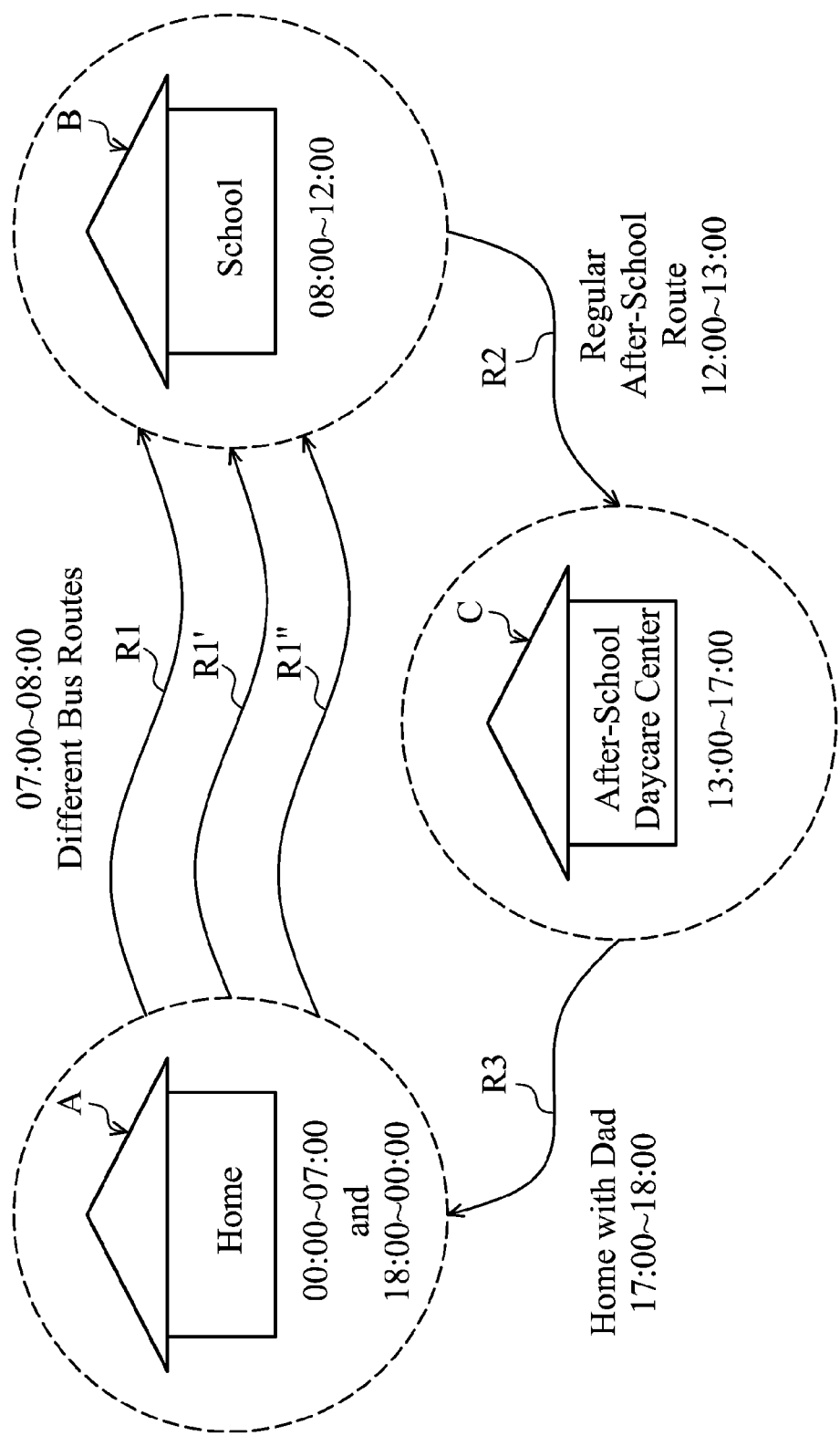
FIG. 3 illustrates a weekday routine of a tracked object (the child of the user)

FIG. 3 illustrates a weekday routine of a tracked object (the child of the user). The child stays at home (marked A) from 00:00 to 7:00 and 18:00 to 00:00, stays at school (marked B) from 08:00 to 12:00, and stays at an after-school daycare center (marked C) from 13:00 to 17:00. From 07:00 to 08:00, the child travels from home A to school B on any of the bus routes R1, R1' and R1". From 12:00 to 13:00, the child travels from school B to the after-school daycare center C on a regular after-school route R2. From 17:00 to 18:00, the child travels from the after-school daycare center C to home A with the child's father (regarded as route R3).

FIGS. 4A and 4B shows a position information collection table 400 of the child, which is organized from the position information uploaded during a data-collection period, wherein the data-collection period lasts N days and N is 30. On the weekdays, the uploaded position information shows that the child followed the weekday routine of FIG. 3, except for the 16$^{th}$ day, when the child traveled from school B to the after-school day care center C along another route RA rather than the regular after-school route R2. Every Saturday, the child left home A at 12:00 and traveled to position O1 along route R4 from 12:00 to 13:00 and stayed in position O1 till 17:00 and returned home A along route R5 from 17:00 to 18:00. Every Sunday, the child left home A at 07:00 and traveled to position O2 along route R6 from 07:00 to 08:00 and stayed in position O2 till 17:00 and returned home A along route R7 from 17:00 to 18:00.

Based on the table 400, a behavioral model of the child equipped with the tracking device 100 is built up. The behavior analysis of the child may include appearance position analysis and route analysis.

Figure 5A:
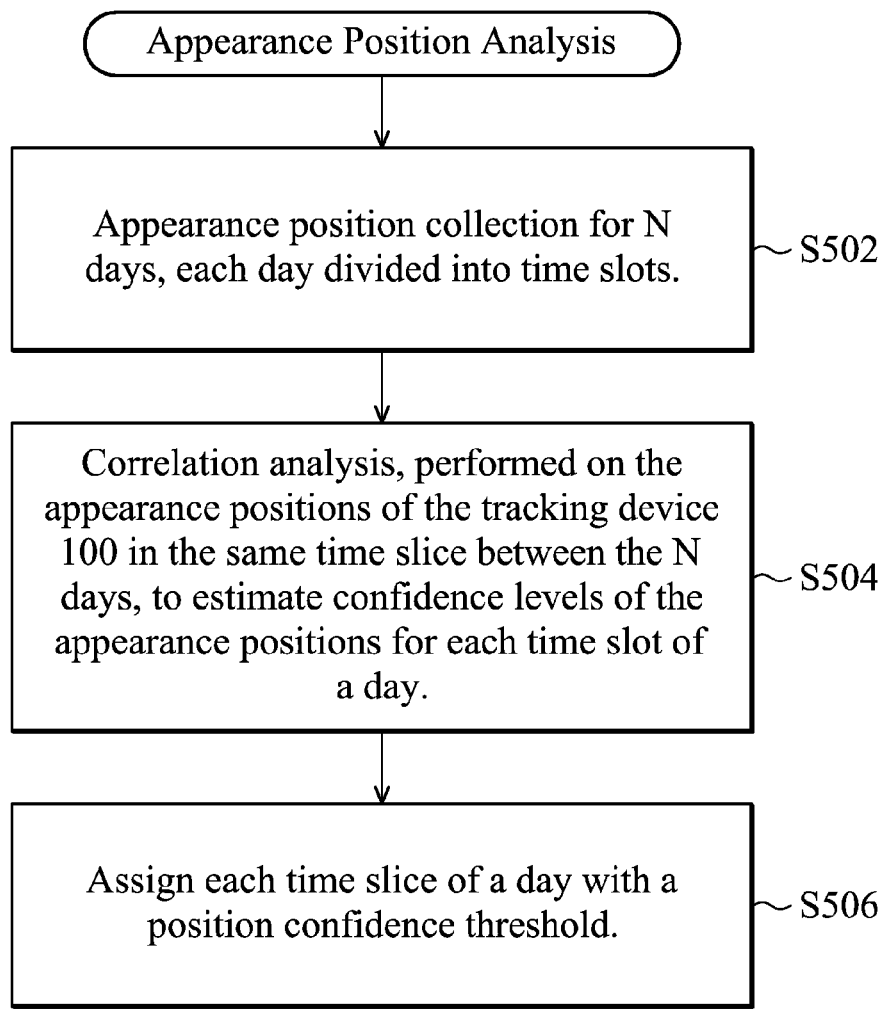
FIG. 5A is a flowchart depicting the procedure of an appearance position analysis in accordance with an exemplary embodiment of the disclosure.

FIG. 5A is a flowchart depicting the procedure of an appearance position analysis in accordance with an exemplary embodiment of the disclosure.

In step S502, an appearance position collection is performed N days and each day is divided into time slots. As shown in table 400, the appearance position collection lasts 30 days and each day is divided into 24 time slots and the appearance positions of the tracked object during the different times slots of the 30 days are recorded. During the 30 days, the tracked object appeared at position A, B, C, O1 or O2 or on any of routes R1, R1', R1", RA and R2 to R7.

In step S504, a correlation analysis is performed on the appearance positions of the tracking device 100 in the same time slot between the N days, to estimate confidence levels of the appearance positions for each time slot of a day. Step S504 is discussed in detail in the following with respect to table 400. From 00:00 to 07:00 and from 18:00 to 00:00, the child was always at home A in the 30 days. The appearance position, home A, corresponds to a confidence level 100% during the time slots 00:00~07:00 and 18:00~00:00. From 07:00 to 08:00, it is shown in table 400 that the child moved along route R1, R1' or R1" on weekdays, stayed at home A on Saturday, and moved along route R6 on Sunday. Thus, during the time slots 07:00~08:00, only the appearance position, home A, is assigned with a confidence level 4/30. From 08:00 to 12:00, it is shown in table 400 that the child stayed at school B on weekdays, at home A on Saturday, and at position O2 on Sunday. Thus, during the time slots 08:00~12:00, the appearance position, school B, corresponds to a confidence level 22/30, the appearance position, home A, corresponds to a confidence level 4/30, and the appearance position O2 corresponds to a confidence level 4/30. From 12:00 to 13:00, it is shown in table 400 that the child moved along route R2 or RA on weekdays, moved along route R4 on Saturday, and stayed at position O2 on Sunday. Thus, during the time slots 12:00~13:00, just the appearance position O2 is assigned with a confidence level 4/30. From 13:00 to 17:00, it is shown in table 400 that the child stayed at the after-school daycare center C on weekdays, at position O1 on Saturday, and at position O2 on Sunday. Thus, during the time slots 13:00~17:

O0, the appearance position, after-school daycare center C, corresponds to a confidence level 22/30, the appearance position O1 corresponds to a confidence level 4/30, and the appearance position O2 corresponds to a confidence level 4/30. From 17:00 to 18:00, it is shown in table 400 that the child moved along route R3 on weekdays, moved along route R5 on Saturday, and moved along route R7 on Sunday. Thus, during the time slots 17:00~18:00, no particular appearance position is assigned with a confidence level. Note that the confidence level is not limited to the rate of appearance during the data collection period. The confidence level may be rated in other ways.

In step S506, each time slot of a day is assigned with a position-confidence threshold. Only the appearance position at a confidence level greater than the position-confidence threshold is trustworthy and used in setting the intelligent safe zones. When there is no appearance position at a confidence level greater than the position-confidence threshold, the safe zone alarm is not enabled. Step S506 is discussed in detail in the following with respect to table 400. The time slots from 00:00 to 07:00 and from 18:00 to 00:00 each is assigned with a position-confidence threshold 95%, just a little lower than the absolutely high confidence level (100%) of the regular appearance position, home A. The time slot from 07:00 to 08:00 is assigned with a default position-confidence threshold 80%, much greater than the low confidence level (4/30) of the infrequent appearance position, home A. Furthermore, during the time slot from 07:00 to 08:00, the tracked object is sometimes expected on a commute from home A to school B, or from home A to position O2. The time slots from 08:00 to 12:00 each is assigned with a position-confidence threshold 70%, just a little lower than the considerably high confidence level (22/30) of the frequent appearance position, home B, and much greater than the low confidence level (4/30) of the infrequent appearance position, position O2 or home A. The time slot from 12:00 to 13:00 is assigned with the default position-confidence threshold 80%, much greater than the low confidence level (4/30) of the infrequent appearance position, position O2. Furthermore, during the time slot from 12:00 to 13:00, the tracked object is sometimes expected on a commute from school B to the after-school daycare center C, or from home A to position O1. The time slots from 13:00 to 17:00 each is assigned with a position-confidence threshold 70%, just a little lower than the considerably high confidence level (22/30) of the frequent appearance position, after-school daycare center C, and much greater than the low confidence level (4/30) of the infrequent appearance position, position O1 or position O2. The time slot from 17:00 to 18:00 is assigned with the default position-confidence threshold 80% because the tracked object was accustomed to move around during this time slot in the 30 days and no appearance position corresponds to the time slot. During the time slots from 18:00 to 19:00, the tracked object is expected on a commute from the after-school daycare center C to home A, from position O1 to home A, or from position O2 to home A. The position-confidence thresholds may be estimated on the server 114 side based on the information contained in the table 400. In another exemplary embodiment, the user 116 may operate his personal computing device (e.g., the smartphone 118 and the personal computer 120) to communicate with the server 114 and thereby manually set the position-confidence thresholds of the different time slots of a day.

Figure 5B:
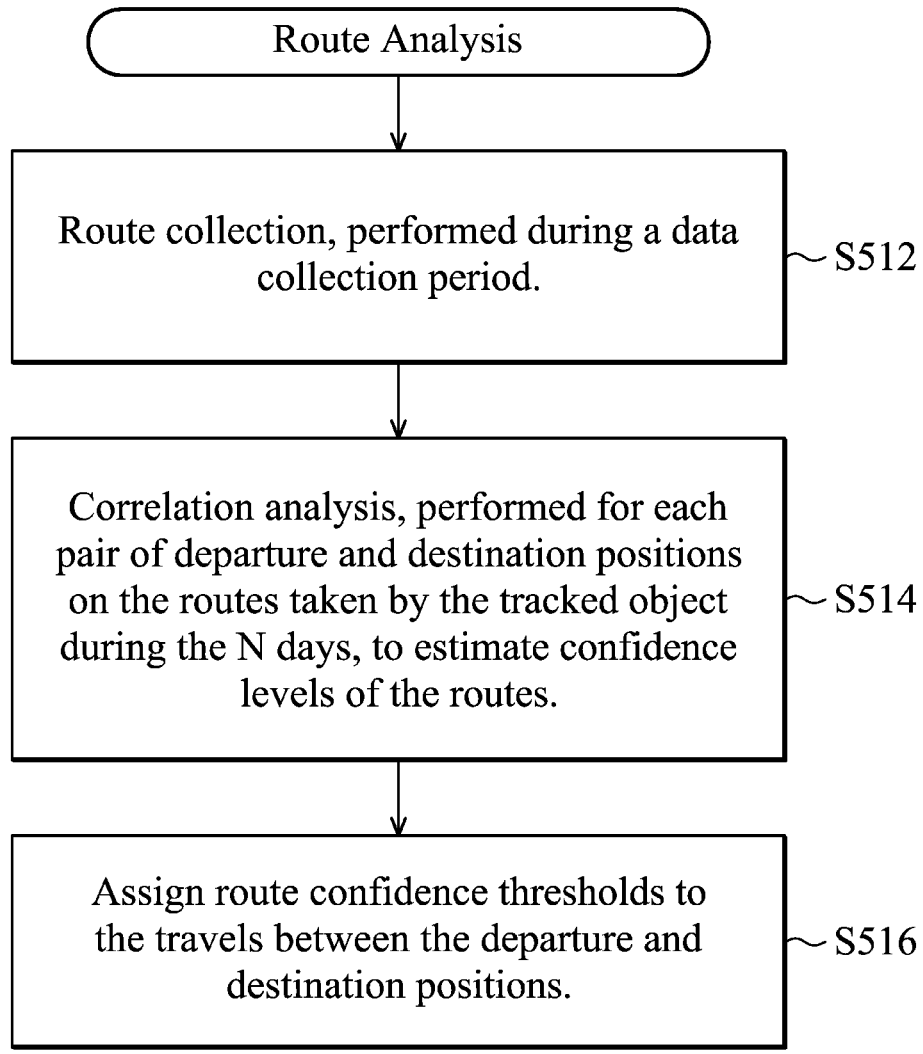
FIG. 5B is a flowchart depicting the procedure of a route analysis in accordance with an exemplary embodiment of the disclosure.

FIG. 5B is a flowchart depicting the procedure of a route analysis in accordance with an exemplary embodiment of the disclosure.

In step S512, a route collection is performed during the data-collection period (e.g. N days). As shown in table 400, the route collection lasts 30 days and the routes taken by the tracked object from any departure position to any destination position during the 30 days are recorded. In the 30 days, the tracked object traveled from home A to school B along route R1, R1' or R1", from school B to the after-school daycare center C along route R2 or RA, from the after-school daycare center C to home A along route R3 (with the child's father, e.g. continuously detecting a short-range radio signal from the smartphone of the child's father), from home A to position O1 along route R4, from position O1 back home A along route R5, from home A to position O2 along route R6, from position O2 back home A along route R7.

In step S514, a correlation analysis is performed for each pair of departure and destination positions on the routes taken by the tracked object during the N days, to estimate confidence levels of the routes. Step S514 is discussed in detail in the following with respect to table 400. From home A to school B, route R1 is assigned with a confidence level 11/22, route R1' is assigned with a confidence level 7/22 and route R1" is assigned with a confidence level 4/22. From school B to the after-school daycare center C, route R2 is assigned with a confidence level 21/22 and route RA is assigned with a confidence level 1/22. From the after-school daycare center C to home A, the route R3 is assigned with a confidence level 100%. From home A to position O1, the route R4 is assigned with a confidence level 100%. From position O1 back home A, the route R5 is assigned with a confidence level 100%. From home A to position O2, the route R6 is assigned with a confidence level 100%. From position O2 back home A, the route R7 is assigned with a confidence level 100%. Note that the confidence level is not limited to the rate of appearance during the data collection period. The confidence level may be rated in other ways.

In step S516, each commute between the departure and destination positions is assigned with a route-confidence threshold. Only the route at a confidence level greater than the route-confidence threshold is trustworthy and used in setting the intelligent safe zones. When there is no route at a confidence level greater than the route-confidence threshold, the safe zone alarm is not enabled. Step S516 is discussed in detail in the following with respect to table 400. The travel from home A to school B is assigned with a default route-confidence threshold 40%, just a little lower than a certain confidence level (11/22) of the route R1 and greater than the low confidence levels (7/22 and 4/22) of the infrequent routes R1' and R1". The travel from school B to the after-school daycare center C is assigned with a route-confidence threshold 90%, just a little lower than the considerably high confidence level (11/22) of the normal route R2 but much greater than the low confidence level (1/22) of the exception RA. The travel from the after-school daycare center C to home A is assigned with a route-confidence threshold 95%, just a little lower than the absolutely high confidence level (100%) of the normal route R3. The travel from home A to position O1 is assigned with a route-confidence threshold 95%, just a little lower than the absolutely high confidence level (100%) of the normal route R4. The travel from position O1 back home A is assigned with a route-confidence threshold 95%, just a little lower than the absolutely high confidence level (100%) of the normal route R5. The travel from home A to position O2 is assigned with a route-confidence threshold 95%, just a little lower than the absolutely high confidence level (100%) of the normal route R6. The travel from position O2 back home A is assigned with a route-confidence threshold 95%, just a little lower than the absolutely high confidence level (100%) of the normal route R7. The route-confidence thresholds may be estimated on the server 114 side based on the information contained in the table 400. In another exemplary embodiment, the user 116 may operate his personal computing device (e.g., the smartphone 118 and the personal computer 120) to communicate with the server 114 and thereby manually set the route-confidence thresholds of various departure and destination positions.

Figure 6:
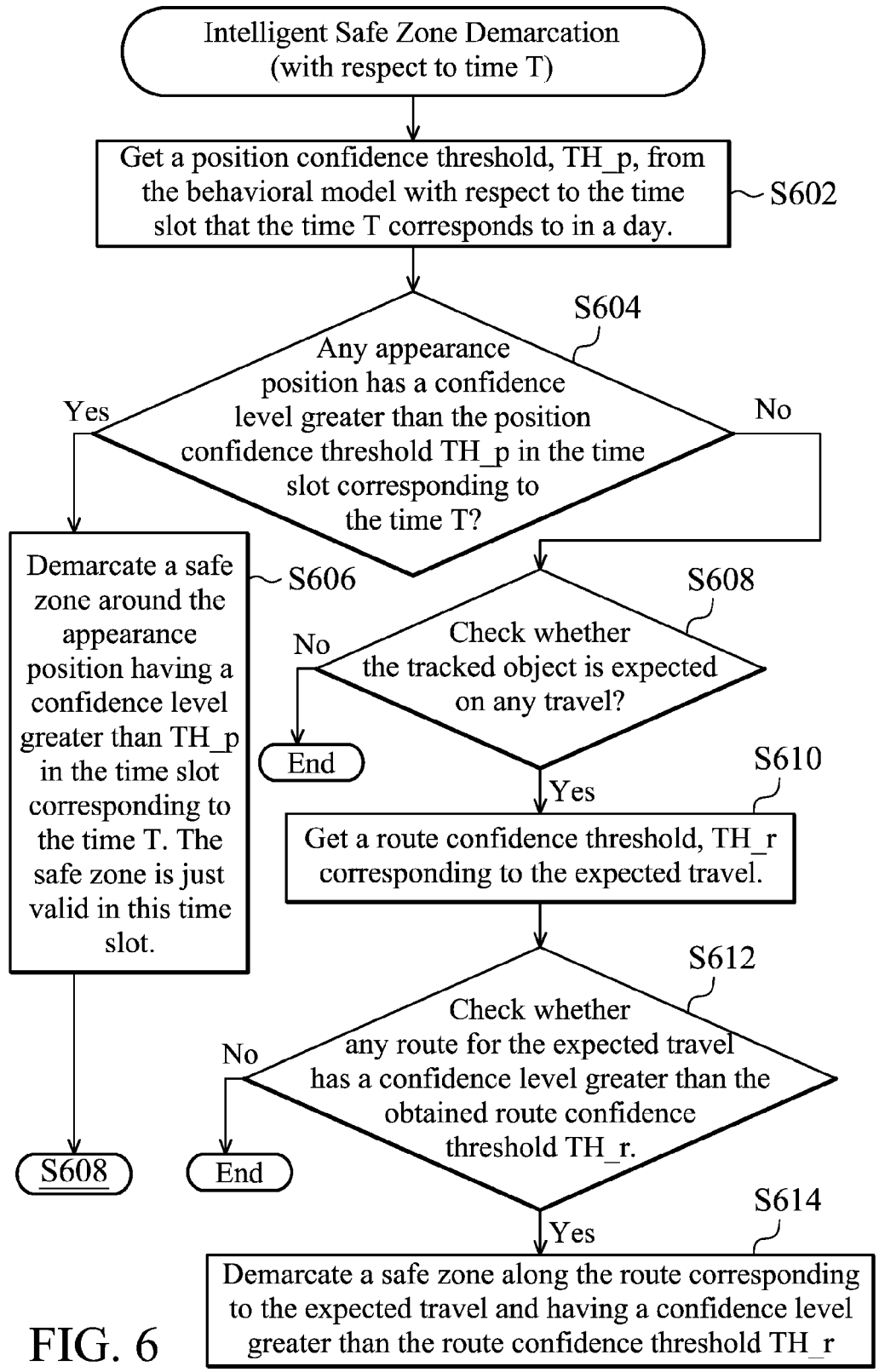
FIG. 6 is flowchart depicting how the behavioral model established according to the procedures of FIGS. 5A and 5B is applied to demarcate intelligent safe zones.

FIG. 6 is flowchart depicting how the behavioral model established according to the procedures of FIGS. 5A and 5B is applied to demarcate intelligent safe zones. As shown, the behavioral model is checked with respect to time T. In step S602, a position-confidence threshold, TH_p, for the time slot that the time T corresponds to in a day is obtained from the behavioral model to be compared with the confidence levels (estimated for the time slot corresponding to the time T) of all appearance positions. In step S604, it is checked whether any appearance position has a confidence level greater than the position-confidence threshold TH_p in the time slot corresponding to the time T. If yes, step S606 is performed to demarcate a safe zone around the appearance position having a confidence level greater than the position-confidence threshold TH_p in the time slot corresponding to the time T. Multiple safe zones are set in step S606 when multiple appearance positions satisfy the position-confidence threshold TH_p.

When it is determined in step S604 that no appearance position has a confidence level greater than the position-confidence threshold TH_p in the time slot corresponding to the time T, step S608 is performed to check whether the tracked object is expected on any travel (from any departure position to any destination position). If no, the procedure is ended and the safe zone alarm is not enabled. If yes, step S610 is performed. In step S610, a route-confidence threshold, TH_r corresponding to the expected travel from a departure position to a destination position is obtained from the behavioral model to be compared with the confidence levels of all historical routes of the expected travel. In step S612, it is checked whether any route for the expected travel has a confidence level greater than the obtained route-confidence threshold TH_r. If no, the procedure is ended and the safe zone alarm is not enabled. If yes, step S614 is performed to demarcate a safe zone along the route corresponding to the expected travel and having a confidence level greater than the route-confidence threshold TH_r. Multiple safe zones are set in step S614 when multiple routes satisfy the route-confidence threshold TH_r. Note that step S608 is further checked after step S606.

According to the procedure of FIG. 6, intelligent safe zones adaptive to habitual behaviors of the tracked object are provided. With respect to the collected position information of the table 400 of FIGS. 4A and 4B, the intelligent safe zones defined according to the procedure of FIG. 6 are discussed in the following paragraphs.

During 00:00~07:00 and 18:00~00:00, a safe zone is set around home A. During 07:00~08:00, safe zones are set along route R1 and along route R6. During 08:00~12:00, a safe zone is set around school B. During 12:00~13:00, safe zones are set along route R2 and along route R4. During 13:00~17:00, a safe zone is set around the after-school daycare center C. During 17:00~18:00, safe zones are set along route R3, along route R5, and along route R7. In this manner, intelligent safe zones adaptive to the habitual behaviors of the tracked object are provided. When the safe zone alarm is enabled and the tracked object leaves the defined safe zones, an alarm message may be sent to the user (116 of FIG. 1).

In another exemplary embodiment wherein a behavioral model is built just based on the route analysis of FIG. 5B without considering the appearance position analysis of FIG. 5A, steps S608 to S614 of FIG. 6 are performed apart from the steps S602 to S606 when checking the behavioral model.

When the data collection period is extended to more than 30 days, more habitual behaviors of the tracked object are observed. For example, the confidence levels of the bus routes R1' and R1" may be reinforced in the extended data collection period. After the extended data collection period, the bus routes R1' and R1" may be regarded as trustworthy and used in setting the intelligent safe zones. In another exemplary embodiment, a tracking-device control method is disclosed, which is discussed with respect to FIG. 1. The tracking-device control method includes the following steps: providing a server 114 for a tracking device 100 comprising a positioning module 102 for satellite navigation, wherein the tracking device 100 further comprises a long-range transceiver 104 for digital cellular communication; and operating the long-range transceiver 104 to regularly transmit position information of the tracking device 100 to the server 114 during a data-collection period for behavior analysis of a tracked object equipped with the tracking device 100 and for safe-zone demarcation of the tracking device 100. The safe zones are adaptive to habitual behaviors of the tracked object. The habitual behaviors are obtained from the behavior analysis, While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A tracking device, comprising:
a positioning module for satellite navigation;
a long-range transceiver for digital cellular communication; and
a microcontroller, controlling the positioning module and the long-range transceiver,
wherein:
the microcontroller is further configured to operate the long-range transceiver to regularly transmit position information of the tracking device to a server during a data-collection period for behavior analysis of a tracked object equipped with the tracking device and for safe-zone demarcation of the tracking device, the safe-zone demarcation is adaptive to habitual behaviors of the tracked object, and the habitual behaviors are obtained from the behavior analysis;
the position information indicates appearance positions of the tracking device that show positions at which the tracking device appears;
the data-collection period lasts N days, N is a number and each day of the N days is divided into time slots;
a correlation analysis is performed on the appearance positions of the tracking device in the same time slot between the N days, to estimate confidence levels of the appearance positions for each time slot of a day; and
each time slot of a day corresponds to a position-confidence threshold for the safe-zone demarcation.

2. The tracking device as claimed in claim 1, wherein:
at time T after the N days, the position-confidence threshold for the time slot that the time T corresponds to in a day is compared with the confidence levels of the appearance positions estimated for the time slot corresponding to the time T; and a safe zone is demarcated around the appearance position having a confidence level greater than the position-confidence threshold in the time slot corresponding to the time T.

3. The tracking device as claimed in claim 2, wherein:
the position information further shows routes taken by the tracked object from a departure position to a destination position in the N days.

4. The tracking device as claimed in claim 3, wherein:
a correlation analysis is performed on the routes, to estimate confidence levels of the routes; and
a commute from the departure position to the destination position corresponds to a route-confidence threshold.

5. The tracking device as claimed in claim 4, wherein:
when the tracked object is expected to travel from the departure position to the destination position after the N days, the route-confidence threshold is compared with the confidence levels of the routes; and
a safe zone is demarcated along the route having a confidence level greater than the route-confidence threshold.

6. The tracking device as claimed in claim 1, further comprising:
a short-range transceiver for radio-signal communication within a shorter range in comparison with the digital cellular communication,
wherein the short-range transceiver and the positioning module are provided for detection of the position information.

7. A tracking device comprising:
a positioning module for satellite navigation;
a long-range transceiver for digital cellular communication; and
a microcontroller, controlling the positioning module and the long-range transceiver,
wherein:
the microcontroller is further configured to operate the long-range transceiver to regularly transmit position information of the tracking device to a server during a data-collection period for behavior analysis of a tracked object equipped with the tracking device and for safe-zone demarcation of the tracking device, the safe-zone demarcation is adaptive to habitual behaviors of the tracked object, and the habitual behaviors are obtained from the behavior analysis;
the position information regularly transmitted to the server during the data-collection period shows routes taken by the tracked object from a departure position to a destination position;
a correlation analysis is performed on the routes to estimate confidence levels of the routes; and
a commute from the departure position to the destination position corresponds to a route-confidence threshold for the safe-zone demarcation.

8. The tracking device as claimed in claim 7, wherein:
when the tracked object is expected to travel from the departure position to the destination position after the data-collection period, the route-confidence threshold is compared with the confidence levels of the routes; and
a safe zone is demarcated along the route having a confidence level greater than the route-confidence threshold.

9. The tracking device as claimed in claim 7, further comprising:
a short-range transceiver for radio-signal communication within a shorter range in comparison with the digital cellular communication,
wherein the short-range transceiver and the positioning module are provided for detection of the position information.

10. A tracking device control method, comprising:
providing a server for a tracking device comprising a positioning module for satellite navigation, wherein the tracking device further comprises a long-range transceiver for digital cellular communication; and
operating the long-range transceiver to regularly transmit position information of the tracking device to the server during a data-collection period for behavior analysis of a tracked object equipped with the tracking device and for safe-zone demarcation of the tracking device, wherein the safe-zone demarcation is adaptive to habitual behaviors of the tracked object and the habitual behaviors are obtained from the behavior analysis,
wherein:
the position information indicates appearance positions of the tracking device that show positions at which the tracking device appears;
the data-collection period lasts N days, N is a number and each day of the N days is divided into time slots;
a correlation analysis is performed on the appearance positions of the tracking device in the same time slot between the N days, to estimate confidence levels of the appearance positions for each time slot of a day; and
each time slot of a day corresponds to a position-confidence threshold for the safe-zone demarcation.

11. The tracking device control method as claimed in claim 10, wherein:
at time T after the N days, the position-confidence threshold for the time slot that the time T corresponds to in a day is compared with the confidence levels of the appearance positions estimated for the time slot corresponding to the time T; and
a safe zone is demarcated around the appearance position having a confidence level greater than the position-confidence threshold in the time slot corresponding to the time T.

12. The tracking device control method as claimed in claim 11, wherein:
the position information further shows routes taken by the tracked object from a departure position to a destination position in the N days.

13. The tracking device control method as claimed in claim 12, wherein:
a correlation analysis is performed on the routes, to estimate confidence levels of the routes; and
a commute from the departure position to the destination position corresponds to a route-confidence threshold.

14. The tracking device control method as claimed in claim 13, wherein:
when the tracked object is expected to travel from the departure position to the destination position after the N days, the route-confidence threshold is compared with the confidence levels of the routes; and
a safe zone is demarcated along the route having a confidence level greater than the route-confidence threshold.

15. The tracking device control method as claimed in claim 10, wherein:
a short-range transceiver is further provided within the tracking device for radio-signal communication within a shorter range in comparison with the digital cellular communication; and
the short-range transceiver and the positioning module are provided for detection of the position information.

16. A tracking device control method comprising:
providing a server for a tracking device comprising a positioning module for satellite navigation, wherein the tracking device further comprises a long-range transceiver for digital cellular communication; and
operating the long-range transceiver to regularly transmit position information of the tracking device to the server during a data-collection period for behavior analysis of a tracked object equipped with the tracking device and for safe-zone demarcation of the tracking device, wherein the safe-zone demarcation is adaptive to habitual behaviors of the tracked object and the habitual behaviors are obtained from the behavior analysis,
wherein:
the position information regularly transmitted to the server during the data-collection period shows routes taken by the tracked object from a departure position to a destination position;
a correlation analysis is performed on the routes to estimate confidence levels of the routes; and
a commute from the departure position to the destination position corresponds to a route-confidence threshold for the safe-zone demarcation.

17. The tracking device control method as claimed in claim 16, wherein:
when the tracked object is expected to travel from the departure position to the destination position after the data-collection period, the route-confidence threshold is compared with the confidence levels of the routes; and
a safe zone is set along the route having a confidence level greater than the route-confidence threshold.

18. The tracking device control method as claimed in claim 16, wherein:
a short-range transceiver is further provided within the tracking device for radio-signal communication within a shorter range in comparison with the digital cellular communication; and
the short-range transceiver and the positioning module are provided for detection of the position information.

* * * * *